(12) United States Patent
Schneider-Die-Gross et al.

(10) Patent No.: US 12,497,900 B2
(45) Date of Patent: Dec. 16, 2025

(54) SYSTEM FOR ATTACHING A TURBOMACHINE BLADE

(71) Applicant: SAFRAN AIRCRAFT ENGINES, Paris (FR)

(72) Inventors: Julien Paul Schneider-Die-Gross, Moissy-Cramayel (FR); Celia Iglesias Cano, Moissy-Cramayel (FR); Lucas Antoine Christophe Lauwick, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/839,976

(22) PCT Filed: Feb. 20, 2023

(86) PCT No.: PCT/FR2023/050238
§ 371 (c)(1),
(2) Date: Aug. 20, 2024

(87) PCT Pub. No.: WO2023/156751
PCT Pub. Date: Aug. 24, 2023

(65) Prior Publication Data
US 2025/0179924 A1    Jun. 5, 2025

(30) Foreign Application Priority Data

Feb. 21, 2022 (FR) ...................................... 2201522

(51) Int. Cl.
*F01D 5/30*      (2006.01)
*F01D 5/28*      (2006.01)
(52) U.S. Cl.
CPC ............... *F01D 5/30* (2013.01); *F01D 5/282* (2013.01); *F05D 2300/6034* (2013.01)

(58) Field of Classification Search
CPC .......... F01D 5/30; F01D 5/3007; F01D 5/282; F05D 2250/20
See application file for complete search history.

(56) References Cited

U.S. PATENT DOCUMENTS 4,343,593 A * 8/1982 Harris ..................... F01D 5/282
                                        416/241 A
5,672,417 A * 9/1997 Champenois ...... B29D 99/0025
                                                87/8

(Continued)

FOREIGN PATENT DOCUMENTS

FR    2946999 A1    12/2010
FR    2981602 A1    4/2013

(Continued)

OTHER PUBLICATIONS

Search Report and Written Opinion issued in International Application No. PCT/FR2023/050238, mailed Jun. 12, 2023 (14 pages).

*Primary Examiner* — Courtney D Heinle
*Assistant Examiner* — Cameron A Corday
(74) *Attorney, Agent, or Firm* — Bookoff McAndrews, PLLC

(57) ABSTRACT

A system including: a blade including, at the level of the blade root, two portions spaced apart from each other in the transverse direction X so as to provide therebetween a cavity extending downwards in the direction Y of the height of the blade, from a cavity bottom to a cavity opening on the outside, located at the level of the lower end of the blade root, an attachment element of the blade partially engaged inside the cavity, the engaged part having a shape, taken in a plane defined by the directions X and Y, which extends towards the bottom while flaring out in the direction X, the two spaced apart portions of the blade root which are in (Continued)

contact with the flared shape of the attachment element having corresponding flared shapes.

15 Claims, 7 Drawing Sheets

(56) References Cited

U.S. PATENT DOCUMENTS

| | | | | |
|---|---|---|---|---|
| 10,391,724 | B2* | 8/2019 | Parolini | F01D 25/005 |
| 12,134,460 | B2* | 11/2024 | Joudon | B29D 99/0025 |
| 2015/0044054 | A1* | 2/2015 | Loftus | F01D 5/3007 |
| | | | | 29/889.71 |
| 2018/0119549 | A1 | 5/2018 | Vetters et al. | |
| 2018/0334912 | A1* | 11/2018 | Le Meur | B29D 99/0025 |
| 2019/0301290 | A1* | 10/2019 | Kamiya | B29C 70/70 |
| 2019/0323357 | A1* | 10/2019 | Courtier | B64C 11/30 |

FOREIGN PATENT DOCUMENTS

| | | |
|---|---|---|
| WO | 2013079860 A1 | 6/2013 |
| WO | 2014076408 A1 | 5/2014 |
| WO | 2016174346 A1 | 11/2016 |
| WO | 2018189470 A1 | 10/2018 |

\* cited by examiner

[Fig. 1A]
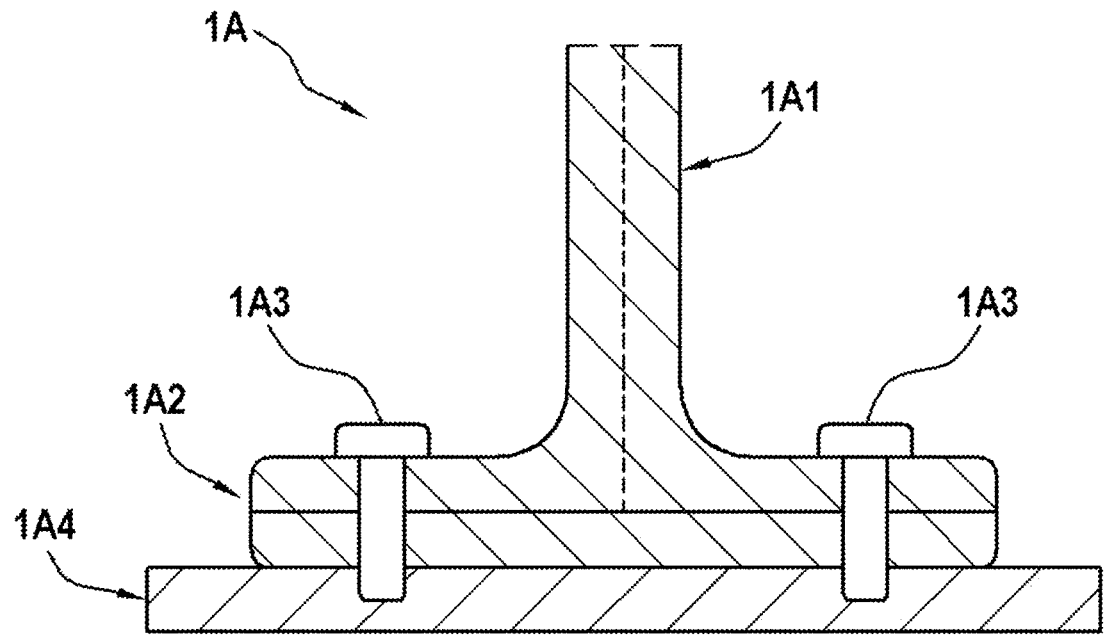
[Fig. 1B]
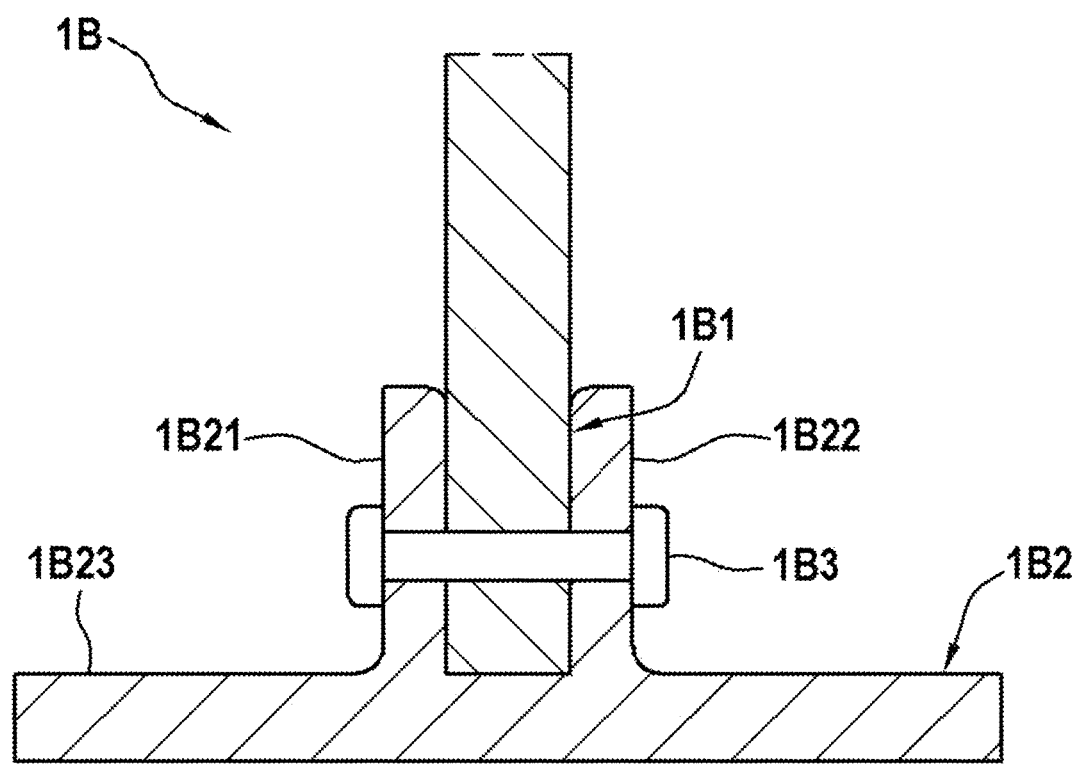

[Fig.2]
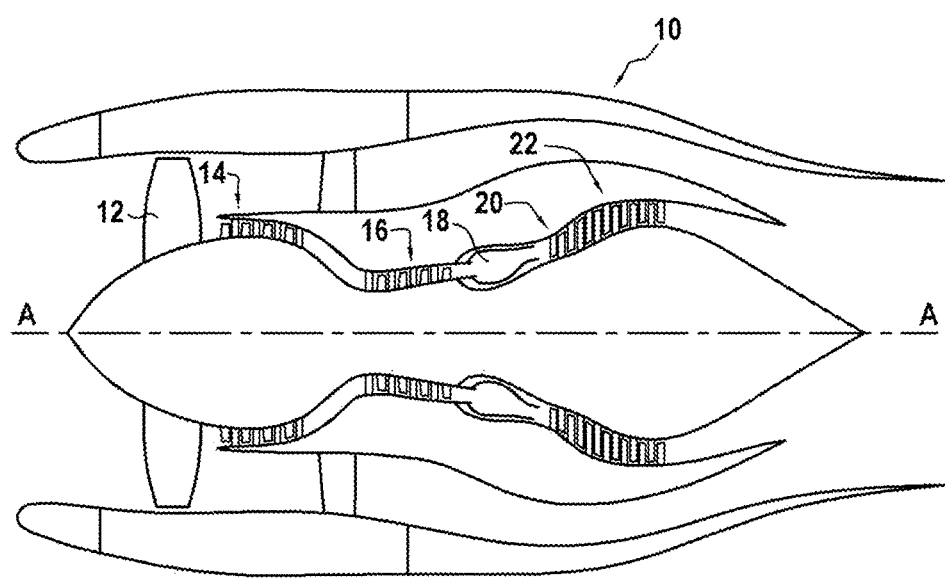

[Fig.3]
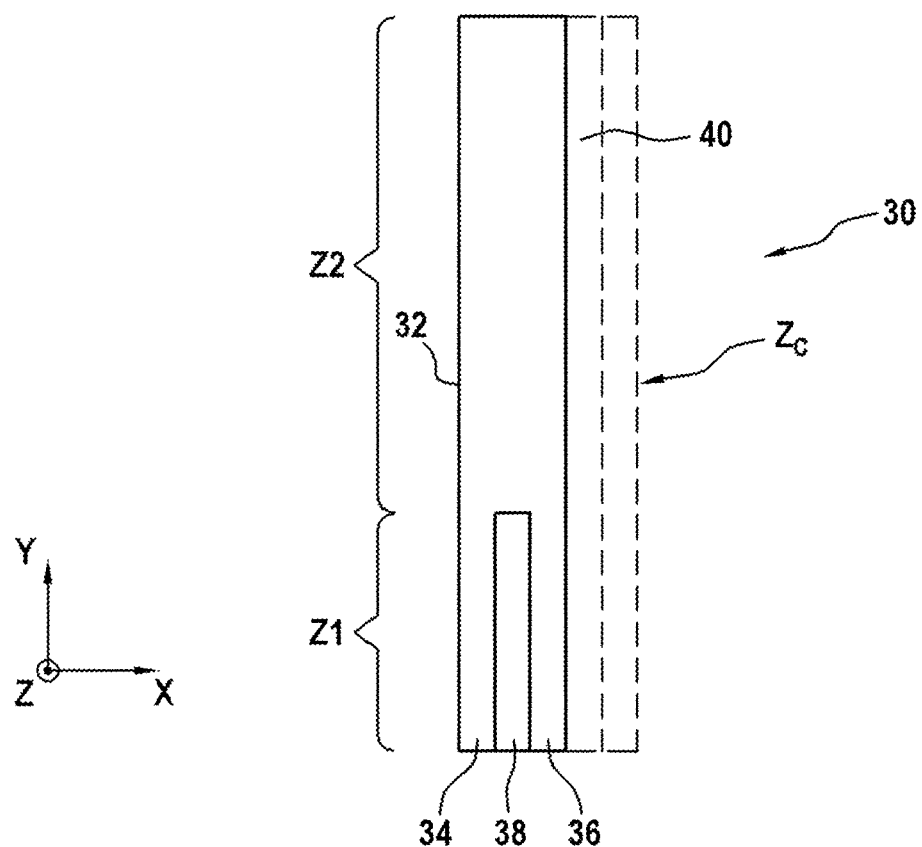

[Fig.4]
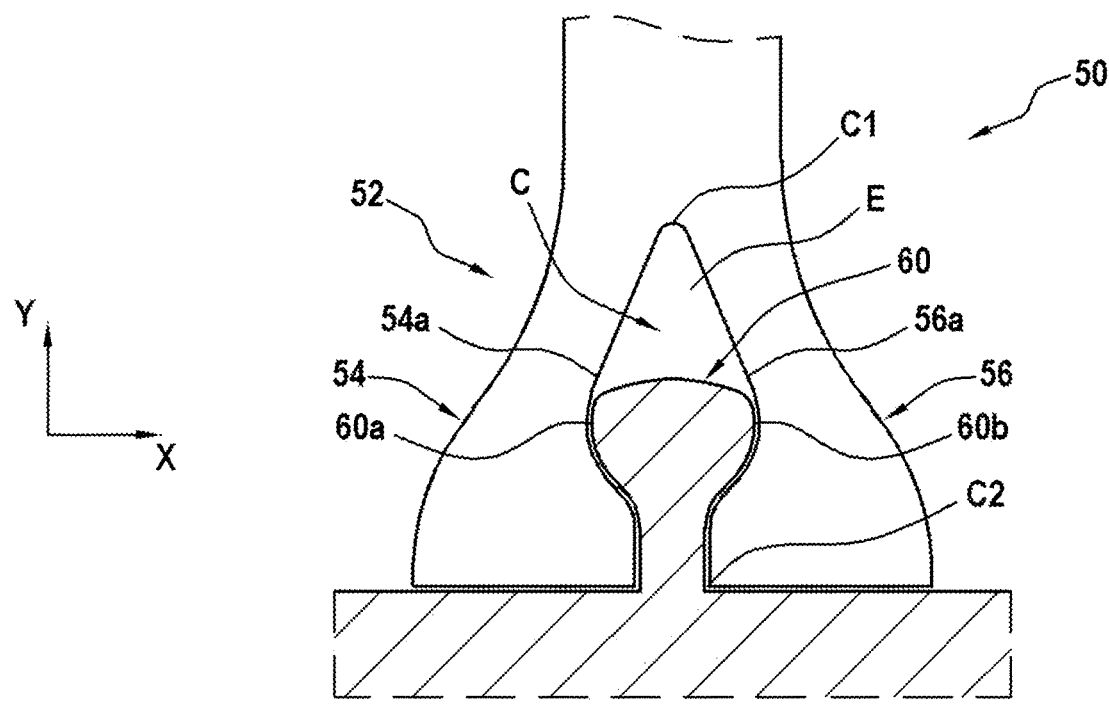

[Fig.5]
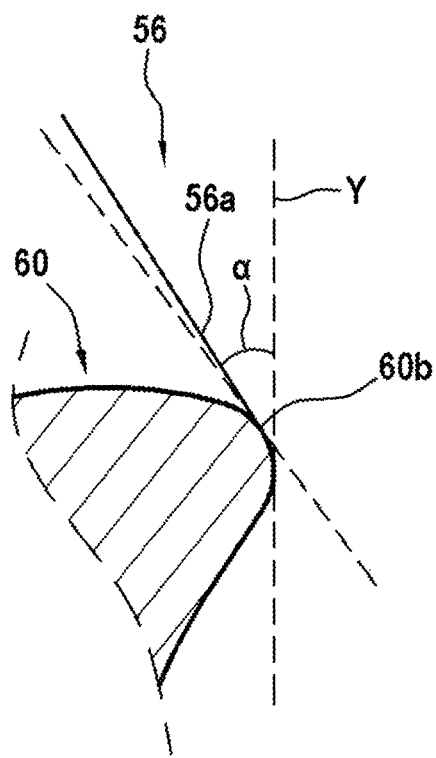
[Fig.6]
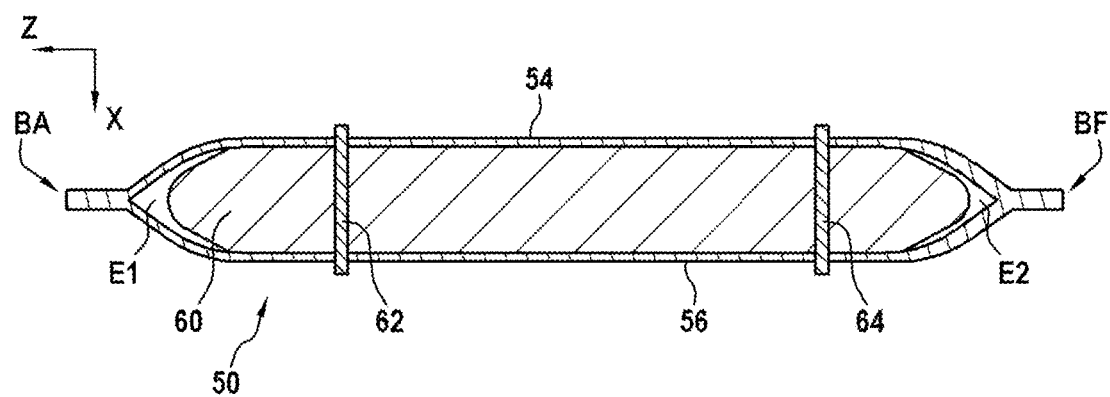

[Fig.7]
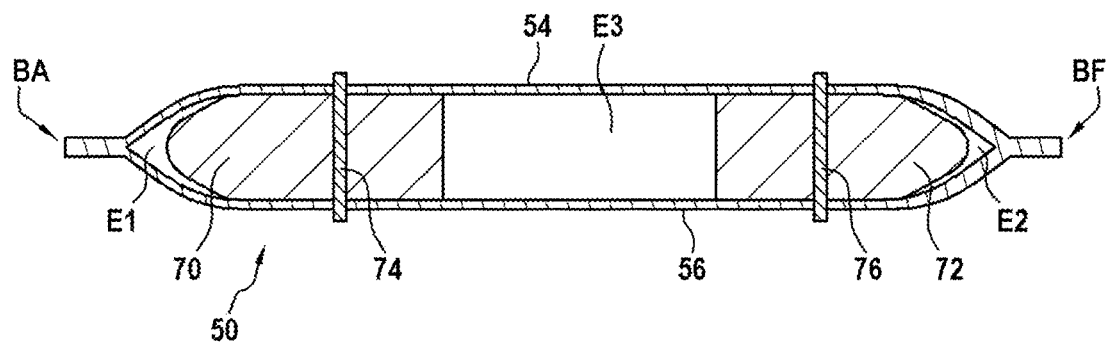
[Fig.8]
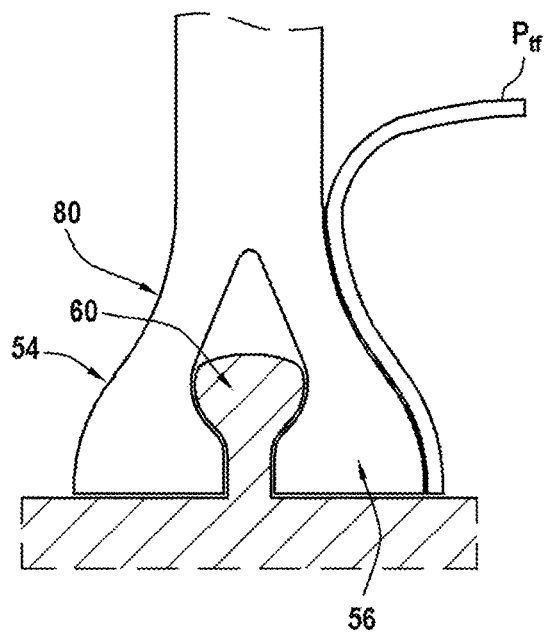

[Fig.9]
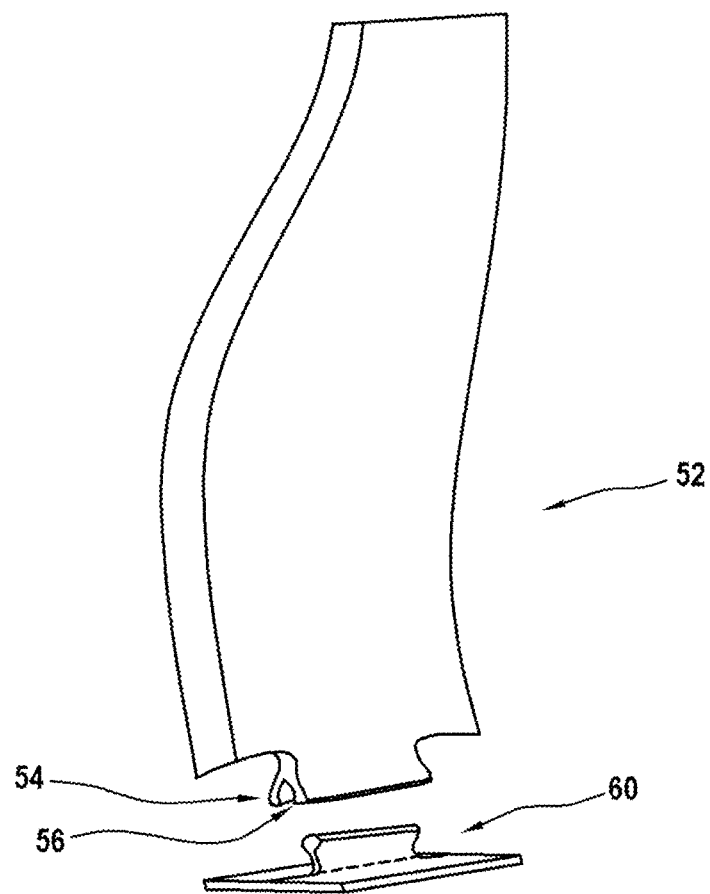

SYSTEM FOR ATTACHING A TURBOMACHINE BLADE

CROSS-REFERENCE TO RELATED APPLICATIONS

This is a National Stage Application under 35 U.S.C. § 371 of International Application No. PCT/FR2023/050238, filed Feb. 20, 2023, now published as WO 2023/156751 A1, which claims priority to French Patent Application No. 2201522, filed on Feb. 21, 2022.

TECHNICAL FIELD

The present disclosure relates to the field of blades made of three-dimensionally woven material for a turbomachine, in particular for an aircraft, and more particularly the fixing of such blades on the turbomachine.

PRIOR ART

Systems are known in the turbomachines, in particular for an aircraft, for fixing composite material blades, for example blades of a fan, on pieces which are mounted on the central structure of the engine or which form part of this structure. These pieces are metallic due to the mechanical and integration constraints on the central structure of the engine that they must meet.

During the operation of the turbomachine (aircraft in flight), the blades of the fan are mainly subjected to bending stresses (due to the incidence of the blades in relation to the air flow encountered) which generate vibrational modes and also to constant aerodynamic pressure stresses. These stresses apply statically and dynamically to the blades. In case of impact (e.g. foreign bodies such as birds, etc.) the blades may be subjected to greater stresses.

Today two types of blade fixing are known, which are:
on the one hand, a fixing by clamping as illustrated in FIG. 1A where a blade 1A (partially represented) made of composite material has in cross section an inverted T shape with the vertical bar 1A1 of the T forming the airfoil of the blade and the horizontal bar 1A2 of the T forming the root of the blade and where fixing elements 1A3 pass through the thickness of the blade root 1A2 to fix it to a horizontal metal piece 1A4 disposed below,
and, on the other hand, a tangential fixing as illustrated in FIG. 1B where a blade 1B (partially represented) made of composite material has in cross section a substantially vertical shape whose blade root 1B1 is set in a metal piece 1B2 disposed below, more particularly in the space provided between two parallel walls 1B21 and 1B22 of the piece 1B2 which extend perpendicular to a horizontal base 1B23 of this piece, fixing elements 1B3 passing horizontally through the two parallel walls 1B21 and 1B22 and the blade root 1B1 to fix it to the piece 1B2.

Although each of these solutions is satisfactory, they nevertheless present certain points of improvement.

The attachment with clamping in FIG. 1A requires modifying the geometry of the blade in its lower part by forming a composite piece with an angle of 90° (blade root 1A2 perpendicular to the airfoil 1A1). This results in a transformation of the stresses exerted on the blade which go from stresses exerted in the plane of the airfoil to stresses exerted out-of-plane that can prove limiting for composite technologies. However, this geometric modification and the remoteness of the mechanical fixings from the airfoil of the blade make it possible to obtain a greater quadratic moment and to offer greater bending stiffness/torsion of the structure thus made.

The tangential attachment of FIG. 1B does not require such a geometric modification of the blade and takes up the bending force due to the shearing phenomenon which occurs at the level of the bores of the fixing elements 1B3. However, such a structure offers the lowest quadratic moment between the two structures of FIGS. 1A and 1B, which makes the structure with tangential attachment of FIG. 1B much less rigid and resistant than the structure with attachment by clamping in FIG. 1B with respect to the bending modes to which the airfoil of the blade is subjected.

The present disclosure therefore aims to at least partially overcome these issues by proposing suitable blade preform, blade and blade fixing system.

DISCLOSURE OF THE INVENTION

To this end, the present disclosure relates to a system for fixing a blade for a turbomachine, characterized in that it comprises:
a blade for a turbomachine made monolithically of composite material from a blade preform made of woven composite material obtained by three-dimensional weaving, the blade preform having been shaped in a mold and embedded in a matrix, the blade preform having a general shape which is elongated in a first direction Y, representing the direction of the height of the blade, and which extends in two other perpendicular directions including a second axial direction Z representing the direction of the chord of the blade and a third transverse direction X representing the direction of the thickness of the blade, the blade preform comprising, aligned along the first direction Y, a lower area Z1 able to form a blade root and an upper area Z2 able to form a blade airfoil including a blade tip, the lower area Z1 being woven and shaped so as to comprise two skins spaced apart from each other in the transverse direction X, thus providing between the two skins a free space which forms a non-interlinking (38) in the woven material, each skin being able to form a portion of the blade root,
the blade including, at the level of the blade root, two portions of the blade root spaced apart from each other in the transverse direction X so as to provide therebetween a cavity C which extends downwards in the direction Y of the height of the blade, from a cavity bottom C1 to a cavity opening C2 on the outside, located at the level of the lower end of the blade root,
at least one attachment element of the blade which is partially engaged inside the cavity, the engaged part of said at least one attachment element having a shape, taken in a plane defined by the two directions X and Y, which extends towards the bottom of the cavity while flaring out in the transverse direction X, the two spaced apart portions of the blade root which are in contact with the flared shape of said at least one attachment element having corresponding flared shapes.

The configuration of the blade preform makes it possible to give the area intended to form the blade root a geometry which is simply obtained from a conventional blade preform shape. This geometry is adapted to a blade fixing thanks to which, in operation, the stresses to which the blade thus fixed is subjected remain in the weaving plane of the preform and are not exerted transversely to this plane as for FIG. 1A described above.

Furthermore, making the two skins transversely spaced apart from each other will allow, after fixing the blade and during its use, generating a higher quadratic moment than for the structure of FIG. 1B described above.

The configuration of said at least one attachment element with a flared shape (or with a stub) makes it possible to control the change in geometry of the blade (configuration of the blade root with the two transversely spaced apart portions) by ensuring its fixing/attachment effectively. The two portions of the blade root transversely spaced apart from each other (these two portions come from the two skins of the preform transversely spaced apart from each other) make it possible to increase the quadratic moment of the composite structure compared to a structure such as that of FIG. 1B.

According to other possible features:
- each of the two spaced apart portions of the blade root comprises an inner face in contact with an outer face of said at least one attachment element, the inner face of each portion of the blade root having, in an area of contact with the most flared part of the outer face of said at least one attachment element, according to a sectional view in a plane defined by the directions X and Y, an inclination comprised between 5° and 35° relative to the direction Y;
- said at least one attachment element extends along at least part of the cavity of the blade root in the axial direction Z;
- said at least one attachment element extends along part of the cavity of the blade root and comprises several attachment elements spaced apart from each other in the axial direction Z;
- the cavity of the blade root is closed at the two opposite ends of the blade which respectively define a leading edge and a trailing edge of the blade away from each other in the axial direction Z;
- the cavity of the blade root is open at one of the two opposite ends of the blade which respectively define a leading edge and a trailing edge of the blade away from each other in the axial direction Z;
- the blade fixing system includes transverse fixing elements which pass transversely through said at least one attachment element and the two spaced apart portions of the blade root;
- in the blade preform, each of the two skins extends in the first direction Y over part of the height of the blade preform;
- the blade preform has a monolithic three-dimensional weaving in the part of the preform which extends beyond the two skins including the upper area;
- each of the two skins of the blade preform extends in the axial direction Z over the entire length of the blade preform;
- each of the two skins of the blade preform extends in the axial direction Z over part of the length of the blade preform;
- the part of the length of the blade preform is located between the two opposite ends of the blade preform which are respectively able to form a leading edge and a trailing edge of the blade;
- the part of the length of the blade preform extends to one of the two opposite ends of the blade preform which are respectively able to form a leading edge and a trailing edge of the blade;
- the blade preform further includes a monolithic complementary area made of three-dimensionally woven material which extends in particular against one of the two skins of the blade preform so as to form an external extra thickness in the transverse direction X, the monolithic complementary area forming with the three-dimensionally woven material of the blade preform a non-interlinking which extends in the upper area to the upper end of the latter.

The present disclosure also relates to a turbomachine comprising a blade fixing system as briefly set out previously.

BRIEF DESCRIPTION OF THE DRAWINGS

The invention and its advantages will be better understood upon reading the detailed description given below of different embodiments of the invention given by way of non-limiting examples.

FIG. 1A is a schematic cross-sectional view of a system for fixing a blade by clamping according to the prior art;

FIG. 1B is a schematic cross-sectional view of a tangential blade fixing system according to the prior art;

FIG. 2 is a schematic axial sectional view of a turbomachine according to one embodiment of the invention;

FIG. 3 is a schematic cross-sectional view of a blade preform before its shaping according to one embodiment of the invention;

FIG. 4 is a schematic view of a blade fixing system according to one embodiment of the invention in a cross-sectional view;

FIG. 5 is an enlarged partial schematic view of a contact area between anchoring element and blade root portion of FIG. 4;

FIG. 6 is a schematic view of the blade fixing system of FIG. 4 in an axial section view;

FIG. 7 is a schematic view of a blade fixing system according to one variant of embodiment of the system of FIG. 6;

FIG. 8 is a schematic view of a blade fixing system according to one variant of embodiment of the system of FIG. 4;

FIG. 9 is a schematic view of the blade fixing system of FIG. 4, before insertion of the attachment element into the blade root.

DESCRIPTION OF THE EMBODIMENTS

In all of the figures, the common elements are identified by identical numerical references.

FIG. 2 represents, in axial section passing through a vertical plane containing the main axis A, an aircraft turbomachine 10 such as a turbofan engine according to one embodiment of the invention.

The turbomachine 10 includes, from upstream to downstream according to the circulation of the air flow, a fan 12, a low-pressure compressor 14, a high-pressure compressor 16, a combustion chamber 18, a high-pressure turbine 20 and a low-pressure turbine 22.

The fan 12 is provided with a plurality of fan blades mounted angularly about the main axis A on a disk connected here to the low-pressure shaft of the turbomachine. The disk forms part of a central structure of the engine of the turbomachine 10.

Such a fan blade comprises a blade root configured to be mounted on the disk by being fixed to the latter and a blade airfoil which extends from the blade root towards the top of the blade. In known manner, a blade airfoil has an extrados face and an intrados face which each extend from upstream to downstream between a leading edge and a trailing edge of the blade.

The following description relates to a fan blade as described above with reference to FIG. 3 and, in particular, a fan blade preform from which the fan blade is made, as well as a system for fixing such a blade on the turbomachine.

It should be noted that the blade preform, the blade obtained from this preform and the system for fixing such a blade can relate to other types of blades of the turbomachine described above or other turbomachines. Particularly, the blades concerned by the present invention can be blades of a flow straightener (OGV) for an unducted fan, that is to say static blades. The blades concerned by the present invention can also relate to blades such as those of the fan described above, or even, more generally, compressor or turbine blades for a turbomachine. Note that the blades concerned may or may not be equipped with a variable setting mechanism. Moreover, the turbomachine including such blades can be ducted or unducted.

FIG. 3 schematically represents a cross section of a blade preform 30 according to a view taken in a plane defined by two directions X (transverse direction representing the direction of the width or thickness of the blade preform and therefore of the blade) and Y (direction which represents the direction of the height of the blade preform and therefore of the blade), it being understood that the blade preform also extends in the axial or longitudinal direction Z perpendicular to the two first directions and corresponding to the chord of the blade.

As represented in FIG. 3, the blade preform 30 comprises a first area or lower area Z1 which is able to form a blade root (the area Z1 can encompass the blade root and also a part called stilt located above and which forms a transition between the root and the airfoil of the blade) and a second area or upper area Z2, located above the area Z1, and which is able to form a blade airfoil. The delimitation between the areas Z1 and Z2 can be different and, for example, the area Z2 can include the stilt of the blade as is the case on the representation of FIG. 3.

The blade preform of FIG. 3 is made in a known manner of woven composite material following a three-dimensional weaving of fibers, for example carbon fibers, for example according to a 3D interlock weave.

The blade preform of FIG. 3 is at a manufacturing stage where it has not yet been shaped and can therefore be referred to as preform blank.

At the upper end, in the second area Z2, the weaving begins by making a skin or upper segment 32 which will form the airfoil and the stilt of the blade. This area Z2 of the preform has a monolithic three-dimensional weaving.

A non-interlinked area begins below this segment 32 and comprises a first skin or lower segment 34 and a second skin or lower segment 36 which are woven jointly in a non-interlinked manner with a non-interlinked plane 38. Weaving methods that allow making such non-interlinking are well known in the field of the 3D weaving.

The two skins or lower segments 34 and 36 are spaced apart from each other in the transverse direction X due to the non-interlinking made in the 3D woven material. As represented in FIG. 3, each lower skin 34, 36 extends in the direction Y over only part of the height of the blade preform 30 and which here corresponds to the height of the first area Z1 corresponding to the root of the blade.

Each lower skin 34, 36 is intended to form a portion of the root of the blade.

It will be noted that a shaping step such as a known water jet cutting step for the selvedges and non-useful edges of the weaving can be implemented on the blank of FIG. 3 as well as a trimming step on the woven fibers.

The representation illustrated in FIG. 3 suggests that the non-interlinked plane 38 extends along the entire axial dimension (chord) or length of the blade preform blank, taken in the axial direction Z.

This configuration can indeed be envisaged depending on the final configuration retained for the blade and its fixing system.

However, other configurations can be envisaged such as a configuration where each of the two lower skins 34 and 36 separated from each other by the non-interlinked plane 38 extends over only part of the axial dimension (chord) of the blade preform blank. It is the same for the non-interlinked plane 38.

The weaving example described above is only one example among many other weaving examples known to those skilled in the art. Particularly, other non-interlinkings of other weaving techniques such as cross-layers, layer exits or thickness transitions to obtain an analogous preform geometry can be used. Those skilled in the art will find in particular numerous examples of weaving in document WO 2014/076408.

The blade preform blank can then be humidified to soften it and allow easier framing of the fibers. The blank is then introduced into a forming mold whose inner space is adjusted to the desired geometry for the blade preform.

The blade preform thus shaped is disposed in an injection mold, with the dimensions of the desired final blade. One or several inserts can also be inserted into the space formed between the two skins 34 and 36 in order to maintain the internal volume of this space and to prevent the matrix from filling this volume. The matrix, for example an epoxy resin, is then injected according to a known method such as a method known under the terminology LCM (Liquid Composite Molding).

FIG. 4 illustrates in cross section in the plane defined by the directions X and Y an enlarged partial view of a blade fixing system 50 according to one embodiment of the invention.

The blade fixing system 50 comprises, on the one hand, a blade 52 such as the one obtained as described above from the blade preform blank 30 of FIG. 3 and, on the other hand, at least one blade fixing or attachment metal element 60. This attachment element can come from a lower piece for example from the disk of the turbomachine mentioned above or form an insert, for example by fixing in particular by means of screws, used to fix the blade to the turbomachine.

The blade 52 comprises more particularly a blade root comprising two portions or legs 54 and 56 which are spaced apart from each other in the transverse direction X so as to provide an inner cavity C therebetween. The portions or legs 54 and 56 are formed from the spaced apart lower skins 34 and 36 of FIG. 3 and extend axially in the axial direction (chord) Z of the blade (the spacing of the skins apart from each other allows increasing the stiffness). The inner cavity C is formed from the space 38 between the two skins 34 and 36 and also extends in the axial direction Z of the blade.

As represented in FIG. 4, the inner cavity C comprises a bottom C1 located in the area of the blade where the two portions or legs 54 and 56 meet and extends in the direction Y towards the lower end of the blade root to a cavity opening C2 located in line with the lower end of the blade root.

The inner cavity C defined between the two spaced apart portions 54 and 56 has a rounded or flared shape in its inner part located between the opening C2 and the bottom C1. Note that this shape is made during the shaping of the preform and is then geometrically immobilized during the densification of the preform by the resin.

The blade attachment element 60 is partially engaged inside the cavity C and thus extends from its opening C2 to the inside of the cavity, while remaining at a distance from the bottom C1. In the view of FIG. 4, the attachment element 60 has a tightened shape at the level of the cavity opening C2 and which gradually flares out towards the central part of the cavity, thus adopting a general bulb or stub shape.

The configuration of the attachment element and of the spaced apart portions of the blade root defining therebetween the inner cavity in which the attachment element is disposed makes it possible to reliably and simply ensure the fixing of the blade, while controlling the quadratic moment thanks to the spacing of the two portions of the blade root apart from each other. The spacing of the portions of the blade root apart from each other ensures greater stiffness with respect to the bending modes to which the blade is subjected. It will be noted that the attachment element not only ensures the attachment or gripping of the blade root but also the spacing of the two portions of the blade root apart from each other.

The configuration of the spaced apart and thickened portions of the blade root makes it possible to mechanically work the blade root portions down to the bottom of the blade but in limited areas (out-of-plane and in compression).

The two spaced apart portions 54 and 56 of the blade root are tightened around the bulb shape of the attachment element 60 and comprise inner faces 54a and 56a which are locally in contact with lateral outer faces 60a and 60b of the attachment element where the shape of the attachment element is most flared. The inner faces 54a and 56a then extend by converging towards the bottom C1 of the cavity without however approaching each other too quickly after the contact area with the flared shape of the attachment element.

Indeed, it is preferable for the inner faces 54a and 56a to remain as parallel as possible to each other after having passed the contact area, in order to limit the mechanical stresses of the material in the out-of-plane direction.

FIG. 5 partially schematically represents the contact area between the outer face 60b of the attachment element 60 and the inner face 56a of the portion 56 and illustrates the angle of inclination a of the inner face with the vertical direction Y (a symmetrical arrangement is envisaged for the other portion 54). In this example, the angle of inclination a is comprised between 5° and 35° so that the slope of the curve formed by the inner face of each blade root portion, immediately after the contact area, is the least steep possible.

FIG. 6 illustrates a schematic sectional view in a plane defined by the directions X and Z at the level of the flared part of the attachment element 60 of FIG. 4. The thicknesses of the two portions 54 and 56 have been deliberately reduced for the purposes of the illustration.

As represented in this figure, the inner cavity C is closed at the two opposite ends of the blade which respectively define a leading edge BA and a trailing edge BF of the blade aligned with each other following the chord of the blade.

In the representation of FIG. 6, the two spaced apart portions of the blade root 54 and 56 each meet at their two opposite ends to form at the level of the blade root the corresponding part of the leading and trailing edges, it being understood that the leading and trailing edges extend along the entire height of the blade (perpendicular to the plane of FIG. 6).

The attachment element 60 extends axially along almost the entire axial dimension (chord) or length of the blade, with the exception of two inner spaces E1 and E2 framing the attachment element 60 and each located between one end of the attachment element and one of the corresponding leading and trailing edges. These inner spaces extend for example over part of the height of the blade and can be obtained by making a non-interlinking along part of the height of the blade. These inner spaces have the same function as the inner cavity C described above.

Transverse fixing elements 62 and 64, such as screws, complete the blade fixing system by transversely securing the attachment element 60 to the two spaced apart blade root portions 54 and 56, which provides additional security in terms of fixing.

Note that the upper part of the inner cavity C identified by the letter E in FIG. 4 can be filled with a core material, such as a filling foam, for example at the time of injection of the blade preform.

Likewise, the inner spaces E1 and E2 visible in FIG. 6 can also be filled by a similar core material. This filling can be done after the assembly in order to avoid inducing geometric constraints.

The preform can be obtained for example in two ways:
- either by a co-injection method, the attachment element or stub 60 being inserted between the lower skins 54 and 56, then the elements are baked together in a mold after injection of the resin;
- or by insertion and bonding of the attachment element or stub 60 between the skins once the preform has been impregnated, the assembly then being placed in an autoclave to perform the polymerization (the insertion is carried out before polymerization when the preform is flexible and the pairing is relatively simple).

FIG. 7 illustrates a schematic sectional view in a plane defined by the directions X and Z similar to the view in FIG. 6.

However, the blade fixing system here includes two attachment elements 70 and 72 which are away from each other in the axial direction Z (chord) and which are engaged inside the inner cavity C of FIG. 4 between the two spaced apart portions 54 and 56 of the blade root.

The axial spacing of the two attachment elements 70 and 72 apart from each other provides between these elements an inner space or recess E3 which extends for example along the entire height of the cavity C and can also be made via one of the linkings in the weaving as for the spaces E1 and E2. This discontinuity at the level of the attachment element allows reducing the weight of the assembly.

The discontinuous configuration represented in FIG. 7 is only one possible example and can of course take other forms not represented here with a number of different attachment elements and/or having different shapes.

The inner space or recess E3 can also be filled with a filling material as described above.

Transverse fixing elements 74 and 76, such as screws, complete the blade fixing system by transversely securing the respective attachment elements 70 and 72 to the two spaced apart blade root portions 54 and 56.

According to one variant of embodiment illustrated in dotted lines in FIG. 3, the blade preform can also include a monolithic complementary area made of three-dimensionally woven material Zc, made in the form of a skin or additional segment or free section, which extends in particular against one of the two lower skins (against the outer face of this skin), namely here the skin 36, so as to form an external extra thickness in the transverse direction X. The additional skin extends here over the entire height of the preform and is woven jointly in a non-interlinked manner with another non-interlinked plane 40 which here extends in the upper area Z2 to the upper end thereof.

Once the weaving is completed, the additional skin is cut so as to form a skin or transverse segment which will form a platform Ptf of the blade as for the blade 80 illustrated in FIG. 8 (this blade uses the characteristics described in relation to FIG. 4).

Note that this extra thickness makes it possible to design a thicker root portion in particular to increase the mechanical resistance in terms of stiffness or with regard to the assembly by bolting of transverse fixing elements.

Moreover, making an integrated platform as illustrated in FIG. 8 allows reducing the thickness or transverse dimension of the blade in its part constituting the airfoil, thus giving a thinner aerodynamic profile of the airfoil.

Several fibrous materials can be used to make this variant, particularly a first type of fibers to make the preform of FIG. 3 and a second type of fibers to make the platform and the reinforced lower portion of the blade root under the platform.

According to one variant of embodiment not represented, the inner cavity is open at either or both of the two opposite ends defining the leading and trailing edges of the blade along the chord of the blade. In this configuration, the attachment element can have a cross section, in a plane defined by the directions X and Y, in the shape of a dovetail.

For example, the blade is obtained in a single piece by three-dimensional weaving of a fibrous preform such as the one described above.

FIG. 9 illustrates the blade 52 of FIG. 4 before the insertion of the attachment element 60 between the spaced apart portions 54, 56 of the blade root.

Although the present invention has been described with reference to specific exemplary embodiments, it is understood that modifications and changes can be made to these examples without departing from the general scope of the invention as defined by the claims. Particularly, individual characteristics of the different illustrated/mentioned embodiments can be combined in additional embodiments. Consequently, the description and drawings should be considered in an illustrative rather than a restrictive sense.

The invention claimed is:

1. A system for fixing a blade for a turbomachine, wherein it comprises:

a blade for a turbomachine made monolithically of composite material from a blade preform made of woven composite material obtained by three-dimensional weaving, the blade preform having been shaped in a mold and embedded in a matrix, the blade preform having a general shape which is elongated in a first direction Y, representing the direction of a height of the blade, and which extends in two other perpendicular directions including a second axial direction Z representing the direction of a chord of the blade and a third transverse direction X representing the direction of a thickness of the blade, the blade preform comprising, aligned in the first direction Y, a lower area Z1 able to form a blade root and an upper area able to form a blade airfoil including a blade tip, the lower area being woven and shaped so as to comprise two skins spaced apart from each other in the transverse direction X, thus providing between the two skins a free space which forms a non-interlinking in the woven material, each skin being able to form a portion of the blade root, the blade including, at a level of the blade root, two portions of the blade root spaced apart from each other in the transverse direction X so as to provide therebetween a cavity which extends downwards in the direction Y of the height of the blade, from a cavity bottom to a cavity opening on an outside, located at the level of a lower end of the blade root, at least one attachment element of the blade which is partially engaged inside the cavity, an engaged part of said at least one attachment element having a shape, taken in a plane defined by the two directions X and Y, which extends towards the bottom of the cavity while flaring out in the transverse direction X, the two spaced apart portions of the blade root which are in contact with the flared shape of said at least one attachment element having corresponding flared shapes.

2. The blade fixing system according to claim 1, wherein each of the two spaced apart portions of the blade root comprises an inner face in contact with an outer face of said at least one attachment element, the inner face of each portion of the blade root having, in an area of contact with a most flared part of the outer face of said at least one attachment element, according to a sectional view in a plane defined by the directions X and Y, an inclination comprised between 5° and 35° relative to the direction Y.

3. The blade fixing system according to claim 1, wherein said at least one attachment element extends along at least part of the cavity of the blade root in the axial direction Z.

4. The blade fixing system according to claim 1, wherein said at least one attachment element extends along part of the cavity of the blade root and comprises several attachment elements spaced apart from each other in the axial direction Z.

5. The blade fixing system according to claim 1, wherein the cavity of the blade root is closed at two opposite ends of the blade which respectively define a leading edge and a trailing edge of the blade away from each other in the axial direction Z.

6. The blade fixing system according to claim 1, wherein the cavity of the blade root is open at one of two opposite ends of the blade which respectively define a leading edge and a trailing edge of the blade away from each other in the axial direction Z.

7. The blade fixing system according to claim 1, wherein it includes transverse fixing elements which pass transversely through said at least one attachment element and the two spaced apart portions of the blade root.

8. The blade fixing system according to claim 1, wherein, in the blade preform, each of the two skins extends in the first direction Y over part of the height of the blade preform.

9. The blade fixing system according to claim 1, wherein the blade preform has a monolithic three-dimensional weaving in the part of the preform which extends beyond the two skins including the upper area.

10. The blade fixing system according to claim 1, wherein each of the two skins of the blade preform extends in the axial direction Z over an entire length of the blade preform.

11. The blade fixing system according to claim 1, wherein each of the two skins of the blade preform extends in the axial direction Z over part of a length of the blade preform.

12. The blade fixing system according to claim 11, wherein the part of the length of the blade preform is located between two opposite ends of the blade preform which are respectively able to form a leading edge and a trailing edge of the blade.

13. The blade fixing system according to claim 11, wherein the part of the length of the blade preform extends to one of two opposite ends of the blade preform which are respectively able to form a leading edge and a trailing edge of the blade.

14. The blade fixing system according to claim 1, wherein the blade preform further includes a monolithic complementary area made of three-dimensionally woven material which extends in particular against the one of the two skins of the blade preform so as to form an external extra thickness in the transverse direction X, the monolithic complementary area forming with the three-dimensionally woven material of the blade preform a non-interlinking which extends in the upper area to the upper end of a latter.

15. A turbomachine comprising a blade fixing system according to claim 1.

* * * * *